UNITED STATES PATENT OFFICE.

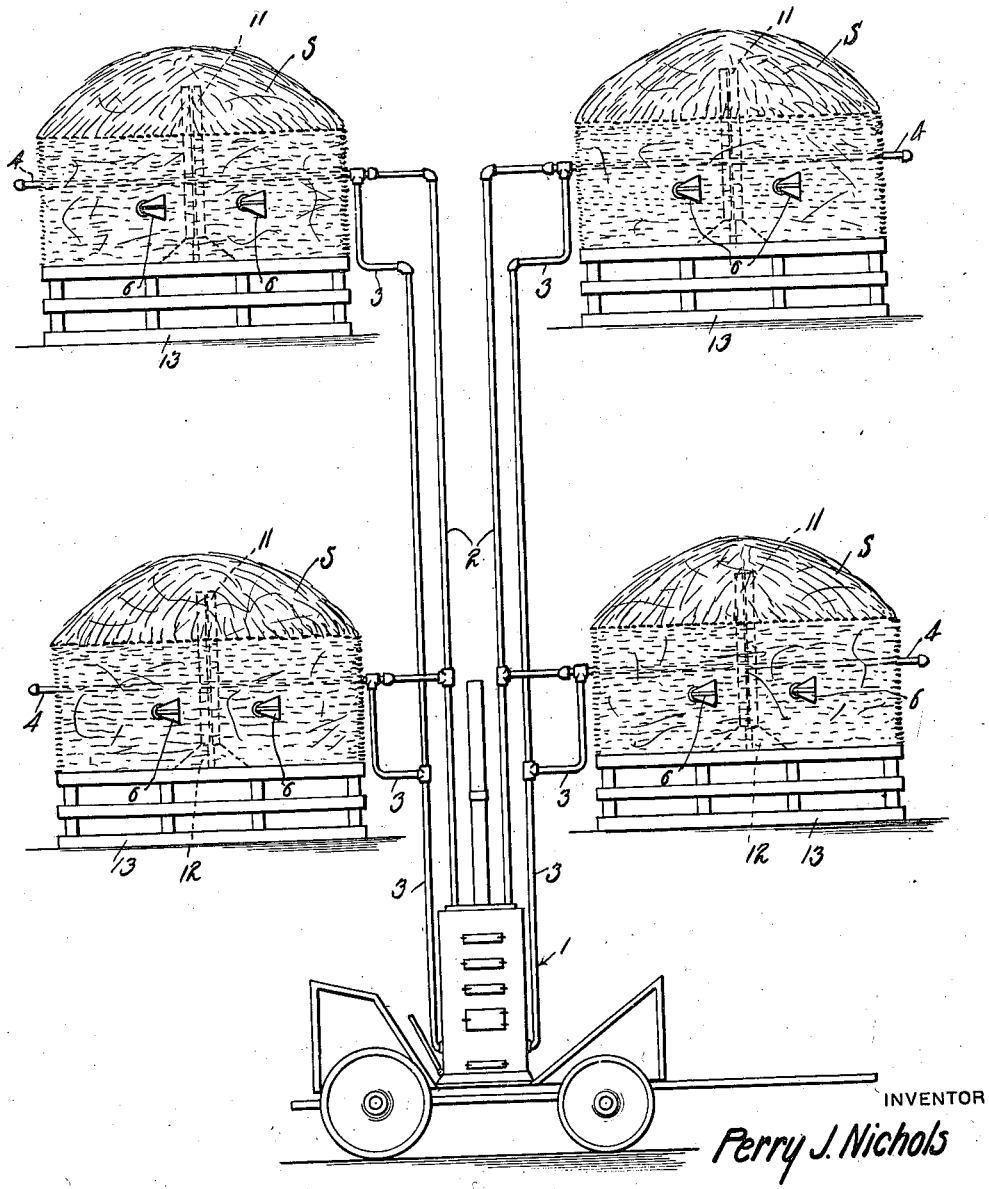

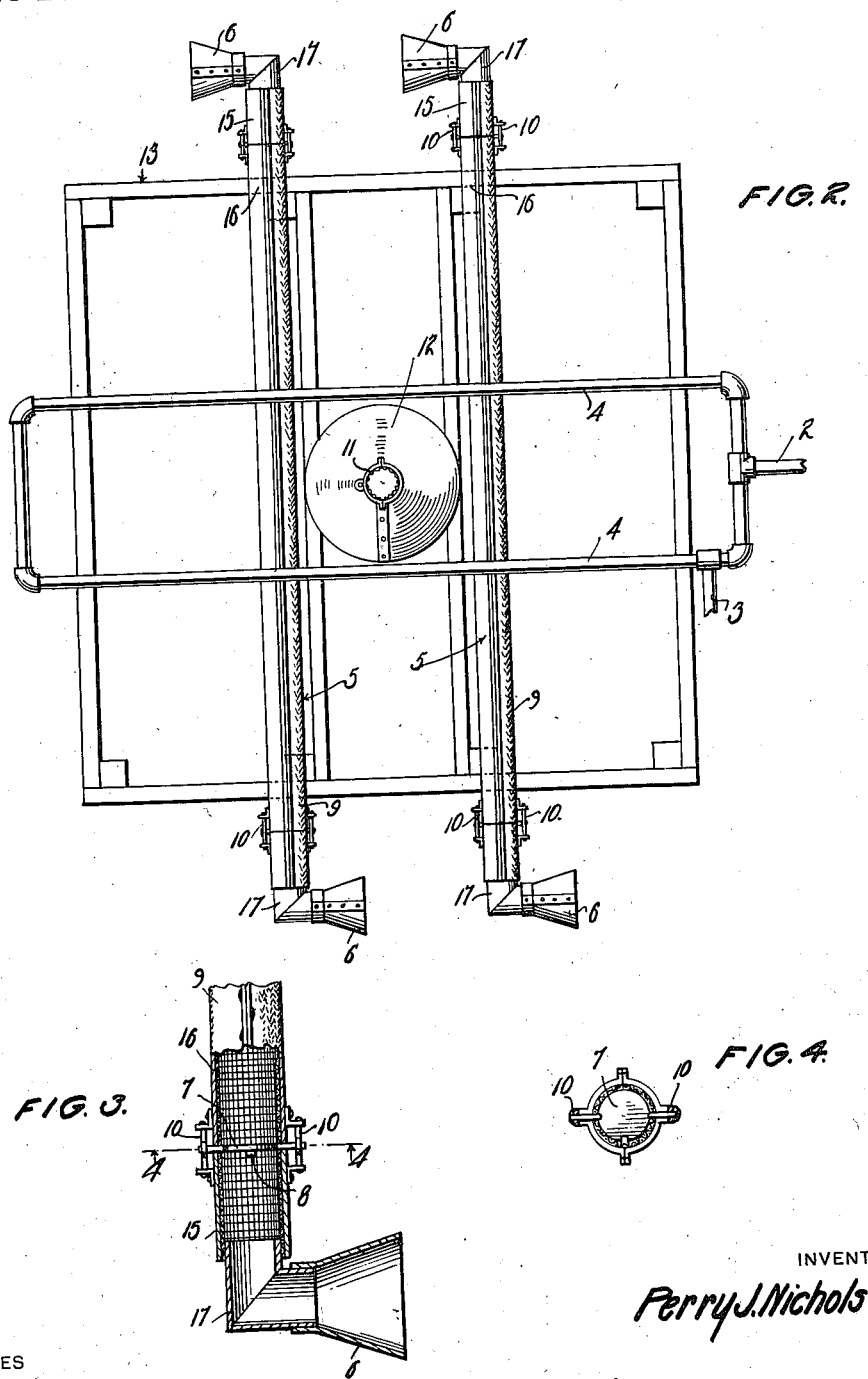

PERRY J. NICHOLS, OF ROCKFORD, ILLINOIS.

APPARATUS FOR CURING HAY, GRAIN, AND THE LIKE.

1,303,945.	Specification of Letters Patent.	Patented May 20, 1919.

Application filed March 14, 1918. Serial No. 222,458.

*To all whom it may concern:*

Be it known that I, PERRY J. NICHOLS, a citizen of the United States, residing at Rockford, in the county of Winnebago and State of Illinois, have invented certain new and useful Improvements in Apparatus for Curing Hay, Grain, and the like, of which the following is a specification.

This invention relates to an apparatus and method for curing hay, grain and the like while in stacks or mounds.

One object of the invention is to provide a simple and efficient apparatus for this purpose, in which hot air is distributed through the stacks in such a manner as to reach the interior thereof and be passed in all directions through the stack.

Another object is to so arrange apparatus within the stack that air currents will be passed through the stack in directions at right angles to each other.

Another object is to provide air distributing pipes so constructed as to prevent clogging thereof by particles of grain, chaff and the like and yet permit the free passage of air therethrough.

Another object is to provide adjustable funnel-shaped mouths for the ventilating pipes to provide for their being turned in any direction to meet the conditions of the atmosphere.

Another object is to provide valves for the ventilating pipes so mounted as to open and close automatically according to the direction of the air currents.

Another object is to provide a method of curing stacked material such as hay, grain and the like, whereby hot air is circulated through pipes embedded in the stack, and after the heat is imparted to the stacked material, the cooled air is returned to the source of heat supply to be again heated and passed through the distributing pipes.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 is a diagrammatic view illustrating the apparatus constituting a part of the invention, Fig. 2 is a plan view showing the apparatus which is applied to a single stack, Fig. 3 is an enlarged detail side elevation partly in longitudinal section of one of the pipe ends, and Fig. 4 is a transverse section taken on the line 4—4 of Fig. 3.

In the embodiment illustrated, a source of heat supply in the form of a furnace 1 is shown with which is connected a pipe system for supplying heat to the stacks of hay or grain to be cured. This pipe system comprises a plurality of hot air conducting pipes 2 leading from the hot air chamber of the furnace 1 and return pipes 3 connected with the lower portion of the furnace by means of which the cooled air is again heated ready for discharge through the pipes 2.

The conducting pipes 2, any desired number of which may be employed, two being here shown, merge at their outer ends into a frame-like pipe 4 which may be of any desired configuration, being here shown rectangular and which is disposed horizontally and designed to be mounted about midway the height of the stack to be treated. This frame-like structure 4 through which the heated air from pipe 2 is designed to pass may be supported by any suitable means, preferably by the hay or grain on which it rests. The air which circulates through this frame 4 imparts its heat by radiation to the hay through which the pipe passes and the cooled air is discharged through pipe 3 and conducted back to the lower portion of the furnace 1 as is shown clearly in Fig. 1.

A plurality of cool air ventilating pipes 5 are arranged transversely through the stacks S and any desired number thereof may be employed, two being here shown disposed in parallel relation in the stacks and provided at their opposite ends with funnel-shaped mouths 6 which are detachably and adjustably mounted on the pipes 5, being held frictionally engaged with said pipes to provide for their adjustment at any desired angle according to the direction in which the wind may be blowing, so that the mouths when properly turned will draw in the air currents and pass them through the stack. Valves 7 are arranged on the pipes 5, preferably adjacent the funnel-shaped ends thereof and are constructed to open in one direction and close in the opposite direction so that the air currents may pass therethrough in one direction and be prevented from passing in the opposite direction. These valves may be of any desired construction, being preferably in the form of the ordinary butterfly valves which close against flanges 8 operating as abutments.

The pipes 5 are preferably constructed in skeleton form of wire mesh and are provided with coverings 9 of canvas or any other suitable foraminous material which will permit the free passage of air therethrough and yet prevent the entrance of chaff, particles of grain, dust and the like into the pipes 5 which would operate to clog them. These canvas coverings 9 may be engaged with the pipes 5 in any suitable manner, being preferably laced around said pipes as shown clearly in Fig. 3. As shown, the valves 7 are located at the joint between the two sections 15 and 16 said section 15 being telescopically engaged with an elbow 17 and held in assembled position by friction. Straps or rods 10 connect sections 15 and 16 which sections are arranged end to end as shown clearly in Fig. 3. These rods 10 also carry the valves 7.

A vertically disposed pipe 11 is also preferably arranged through the center of each stack and terminates at its lower end in a funnel-shaped mouth 12 which is positioned below the bottom of the stack and is designed to receive and direct upward through the stack currents of air which radiate outwardly through the pipe 11 and are distributed through the stack. Each stack is mounted on a suitable platform 13 which is preferably of skeleton form so as to permit the free circulation of air under the stack and as shown in Fig. 1, the funnel-shaped mouths 12 are so positioned that the air from the bottom of the stack will be sucked in and passed upwardly and discharged throughout the length thereof. These pipes 11 are constructed similarly to those 5 which are arranged horizontally within the stack so that the air may pass freely through the canvas covering thereof and the pipe be prevented from becoming clogged.

From the above description it will be obvious that the heated air supplied by the furnace 1 will pass from the hot air chamber out the upper end thereof, through pipes 2, into pipes 4, and circulate through said pipes, radiating the heat therefrom into the stacks and in coiled condition will be delivered into the return pipes 3 and conducted back to the lower portion of furnace 1. This heated air cures the grain or hay and the cool air fed in through pipes 5 and 11 also assists in the curing operation, drying out the grain contained in the stack and preventing heating thereof.

From the foregoing description, taken in connection with the accompanying drawings, the advantages of the construction and of the method of operation will be readily apparent to those skilled in the art to which the invention appertains and while I have described the principle of operation of the invention, together with the device which I now consider to be the best embodiment thereof, I desire to have it understood that the device shown is merely illustrative and that such changes may be made as are within the scope of the claimed invention.

I claim:—

1. An apparatus for curing hay comprising in combination, heat distributing means embedded in the hay, a pipe having a foraminated covering to permit the free passage of air therethrough but prevent the entrance of chaff and the like, and an adjustable neck carried by one end thereof.

2. An apparatus for curing hay, comprising in combination, heat distributing means embedded in the hay, a pipe having a foraminated covering to permit the free passage of air therethrough but prevent the entrance of chaff and the like, a valve arranged in said pipe and controlled by the air currents passing therethrough, said valves closing when the air moves in one direction and opening when the air moves in an opposite direction.

In testimony whereof I affix my signature in presence of two witnesses.

PERRY J. NICHOLS.

Witnesses:
GEO. HAROLD SMITH,
CHAS. MINNICK.